A. C. GAYNOR.
ATTACHMENT FOR MOUTHPIECES.
APPLICATION FILED DEC. 17, 1912.
1,084,206.
Patented Jan. 13, 1914.
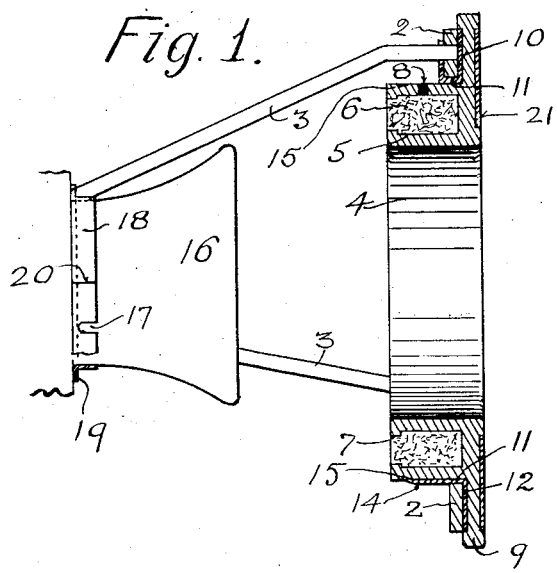
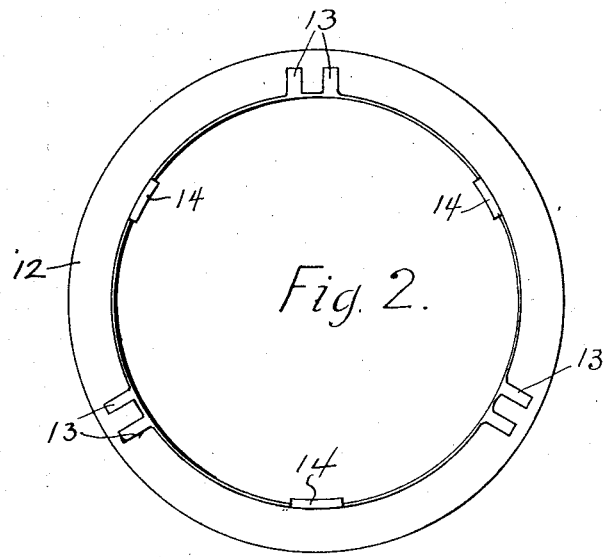
WITNESSES:
INVENTOR
Arthur Cornelius Gaynor

UNITED STATES PATENT OFFICE.

ARTHUR CORNELIUS GAYNOR, OF BRIDGEPORT, CONNECTICUT, ASSIGNOR TO LOUIS BLOCK, OF NEW YORK, N. Y.

ATTACHMENT FOR MOUTHPIECES.

1,084,206.  Specification of Letters Patent.  Patented Jan. 13, 1914.

Application filed December 17, 1912.  Serial No. 737,253.

*To all whom it may concern:*

Be it known that I, ARTHUR CORNELIUS GAYNOR, a citizen of the United States, and a resident of Bridgeport, in the county of Fairfield, in the State of Connecticut, have invented certain new and useful Improvements in Attachments for Mouthpieces, of which the following is a specification.

This invention relates to combined guards and disinfectors for mouthpieces, the primary object of the invention being to secure a disinfectant-holder to a guard in a manner permitting of economical manufacture, easy assemblage, and relative adjustment of holder and guard.

To this and other ends, the invention consists of arrangements and combinations of devices hereinafter described and more particularly set forth in the claims concluding this specification, one embodiment of the invention being illustrated by way of example in the accompanying drawing, forming part hereof, in which—

Figure 1 is a central vertical longitudinal sectional view of the complete device; Fig. 2 is a face view of a connector shown in Fig. 1.

The guard 2 with its legs 3 is or may be similar in construction and operation to the guard shown in Letters Patent granted to Louis Block on the 30th day of January, 1912, and bearing Number 1,016,063.

In the present instance, the disinfectant-holder consists of an annular body part 4 which has an open-end annular recess 5 therein for the reception of an absorbent 6 for the disinfectant, said recess 5 opening rearward or toward the mouthpiece to which the guard 2 is attached as in said patent set forth. The mouth of the recess 5 may have an internal flange 7 for retaining the wick, felt, or other absorbent 6, and an opening 8 through the wall of the holder 4 may serve for the introduction of a liquid disinfectant to the recess 5. At its forward end, the cylindrical holder 4 preferably has an external flange 9 attached thereto or integral therewith, which flange may be recessed annularly on its rear face as at 10, to receive the sheet metal connector for securing the holder to the guard. The connector is preferably formed of an annular body 11 which has at one end an external flange 12 to seat in said recess 10, while, at the other end, said body 11 is preferably formed with lugs 13 bent outwardly substantially parallel with the flange 12 in order to embrace the rear face of the guard 2, and these lugs 13 may, and preferably do, engage with one or more of the legs 3 to prevent the guard from turning relatively to the connector and vice versa. The said body 11 is also formed with spring fingers 14 to bear on the external surface, or against a shoulder 15, of the holder 4 in order to retain the holder in place on the guard while permitting the holder to be rotated on the guard in order to bring the hole 8 uppermost, or for other purposes. In case the rubber mouthpiece 16 has no slots therein into which the ends of the legs 3 may be set, as in said patent set forth, I prefer to seat the ends of such legs in slots 17 formed in an annular clamp 18 which fits on, or grips by spring-pressure, the small end of the said mouthpiece 16, and which is provided with an external flange 19 forming a stop for the ends of said legs. In order to allow for small variations in sizes, the ring 18 and its flange 19 may be slit across, as at 20.

The flange 9 may be recessed annularly on its front face for the reception of an annulus 21 of paper, celluloid, metal or the like, on which directions for use, or other matter, may be printed.

In assembling the parts, the connector is first attached to the guard as shown and then the holder is forced into place, the fingers 14 yielding outwardly and slipping over the outer surface of the body of the holder until they snap into the groove or behind the shoulder where either of these is used.

I do not limit myself to the precise details shown on the drawing and above described.

What I claim as new and desire to secure by Letters Patent of the United States is—

1. In a device of the described class, the combination with an annular disinfectant holder, of a ring surrounding said holder, and an interposed flanged annular connector provided with lugs to engage said ring and with fingers to engage said holder.

2. In a device of the described class, the combination with an annular disinfectant holder, of a ring surrounding said holder and provided with legs, and an interposed flanged annular connector provided with lugs to engage certain of said legs and with fingers to engage said holder.

3. In a device of the described class, the combination with an annular disinfectant holder provided with a shoulder, of a ring surrounding said holder, and an interposed flanged annular connector provided with lugs to engage said ring and with fingers to engage said shoulder.

4. In a device of the described class, the combination with an annular disinfectant holder provided with a projecting flange and with a shoulder, of a ring surrounding said holder and having attaching legs, and an interposed connector provided with a flange, adapted to engage the projecting flange of said holder and also having lugs to engage certain of said legs, and fingers to engage said shoulder.

5. In a device of the described class, the combination with a guard provided with legs, of a coned mouth piece, and a resilient annular clamp of metal, fitted to the base of said mouth piece, and provided with notches to receive the ends of said legs and having a flange integral therewith, said flange forming an abutment for the ends of said legs.

In testimony whereof I have signed my name in the presence of two witnesses.

ARTHUR CORNELIUS GAYNOR.

Witnesses:
   THOMAS M. CULLINAN,
   CLARENCE R. HALL.